United States Patent [19]

Biondetti

[11] 4,228,571

[45] Oct. 21, 1980

[54] HYDRAULIC SUPPORT ELEMENT

[75] Inventor: Mario Biondetti, Schio, Italy

[73] Assignee: Escher Wyss Aktiengesellschaft, Zurich, Switzerland

[21] Appl. No.: 961,241

[22] Filed: Nov. 16, 1978

[30] Foreign Application Priority Data

Dec. 20, 1977 [CH] Switzerland ............ 15715/77

[51] Int. Cl.² .................................. B21B 21/02
[52] U.S. Cl. .................................. 29/116 AD
[58] Field of Search .............. 29/116 AD, 113 AD

[56] References Cited

U.S. PATENT DOCUMENTS

| | | | |
|---|---|---|---|
| 3,726,338 | 4/1973 | Sorenson | 29/116 AD |
| 3,802,044 | 4/1974 | Spillmann et al. | 29/116 AD |
| 3,846,883 | 11/1974 | Biondetti | 29/116 AD |
| 4,058,878 | 11/1977 | Lehmann | 29/116 AD |
| 4,114,959 | 9/1978 | Christ | 29/116 AD |

Primary Examiner—Wayne L. Shedd
Attorney, Agent, or Firm—Werner W. Kleeman

[57] ABSTRACT

A hydraulic support element for mounting a movable part at a stationary support or carrier, comprising an elongate support ledge having a bearing surface for slidingly supporting the movable part. The support ledge together with the support or a part arranged at the support delimits a hydraulic pressure chamber containing hydraulic medium which is under pressure and by means of which the hydraulic support element is supported at the support. The support ledge is supported at the support by means of at least two hydrostatic support arrangements having substantially cylindrical guide surfaces. These hydrostatic support arrangements being arranged adjacent one another in the lengthwise direction of the support ledge and containing piston-like parts.

25 Claims, 17 Drawing Figures

HYDRAULIC SUPPORT ELEMENT

BACKGROUND OF THE INVENTION

The present invention relates to a new and improved construction of a hydraulic support element for supporting a movable part at a stationary support or carrier, which is of the type comprising an elongate support ledge having a bearing or support surface for slidingly supporting the movable part. The support ledge together with the support or a part arranged at the support delimits or bounds a hydraulic pressure chamber containing a hydraulic medium which is under pressure, by means of which the hydraulic support element is supported at the support.

A prior art hydraulic support element of this type, as disclosed in FIG. 6 of U.S. Pat. No. 3,802,044, granted Apr. 9, 1974, is sealingly and movably guided in an elongate groove of the support, in order to accommodate itself to the movable part, in this case the tubular-shaped roll shell of a controlled deflection roll. The sealing of the ledge-shaped or bar-like part in the elongate groove is however associated with appreciable difficulties, particularly since the groove, upon bending-through of the support, tends to deform, for instance open.

A similar construction is also known to the art from the West German Patent Publication No. 1,461,066. Here, the support ledge is pivotable and provided with a sliding shoe at which there is formed a hydrodynamic sliding surface upon which travels the inner surface of the roll shell. Also with this construction there exist the same difficulties.

SUMMARY OF THE INVENTION

Hence, with the foregoing in mind it is a primary object of the present invention to provide a new and improved construction of an hydraulic support element which is not associated with the aforementioned drawbacks and limitations of the prior art proposals.

Another and more specific object of the present invention aims at the provision of a new and improved construction of a support element of the previously mentioned type wherein these disadvantages are avoided and there is obtained a good sealing action by the use of very simple means and with faultless guiding of the support ledge.

Another object is to provide an arrangement of a hydraulic support element wherein it is possible to apply different pressure forces at different locations of a support ledge, and thus, for instance in the case of a roll, to increase or reduce, as desired, the contact pressure at different predetermined locations.

Now in order to implement these and still further objects, which will become more readily apparent as the description proceeds, the invention is manifested by the features that the hydraulic support element of the invention supports the support ledge at the support by means of at least two hydrostatic support arrangements having substantially cylindrical guide surfaces. These hydrostatic support arrangements are dispositioned adjacent one another in the lengthwise direction of the support ledge and contain piston-like parts.

In this way there is avoided the disadvantage of sealing the support ledge in an elongate groove, since the sealing locations are round and can be easily machined. Due to the short extent of the bores in the lengthwise direction of the support and the support ledge, respectively, their deformation is negligible upon bending of these parts. By virtue of the inventive measures there are practically combined the advantages of an elongate or lengthwise extending ledge, such as for instance a more uniform contact action and lower consumption of pressurized medium, with the simpler sealing of piston-like round parts.

The support ledge can possess recesses in which engage piston-like parts which are connected with the support. However, the support also can be provided with recesses in which engage piston-like parts which are connected with the support ledge.

The piston-like parts can preferably be designed as tubular-shaped structures. Consequently, there is obtained an inexpensive, material-saving design.

According to a particularly preferred embodiment the tubular-shaped parts can engage into recesses of the ledge and the support. In this way there is additionally obtained the advantage that the pressure forces acting upon the end surfaces of the tubular-shaped part mutually annihilate one another and such part therefore does not experience any axial forces.

Moreover, the tubular-shaped parts can possess a substantially cylindrical outer surface with lateral recesses which allow for their inclination in relation to the support and the support ledge, respectively. In this way bending deformation of the support and the ledge and the thus resulting mutual lengthwise displacements can be taken into account.

The support ledge and the support also can be provided with projections which engage with both ends of a tubular-shaped cylinder.

The pressure chambers, operatively associated with a support ledge, can be interconnected with one another by means of a connection bore formed in the ledge. In this way it is possible to simplify for instance the construction of a roll which is equipped with the inventive element or with a number of such elements. It is sufficient to provide a smaller number of connection bores leading to the individual pressure chambers. A connection bore in the ledge can be fabricated much simpler than a corresponding bore in the support.

At the region between the cylindrical guide surfaces the ledge can be provided with cut-outs or recesses which reduce its stiffness in its lengthwise direction. Such construction is advantageous in those instances where the ledge should be elastic or yield and snugly bear at a likewise resilient or yielding part, for instance a roll shell.

In order to guide the ledge in the direction of the cylindrical surfaces there can be provided at least one guide part or element. The guide part can be attached at the support and have a guide surface which extends in the direction of movement of the ledge and serves for bracing or supporting the ledge. The guide part can be, however, also a substantially cylindrical plug which is attached at one of the parts, the support or the ledge, and is movably guided at the other part. The guide parts or elements enable guiding of the support ledge in relation to the support independent of the cylindrical surfaces and their countersurfaces. The parts which delimit the pressure chambers thus can be simplified and, for instance, provided with greater play, which, in turn, renders easier taking-up bending deformation.

With the inventive support element it is possible in known manner to form the bearing surface directly at the support ledge. However, in likewise known manner it is possible to equip the support ledge with a bearing shoe which is pivotably connected therewith and upon which there is formed the bearing surface.

In both cases the bearing surface either can be structured as a hydrodynamic sliding surface or can be equipped with hydrostatic bearing pockets which are connected by separate throttle channels with the pressure chamber of the support ledge.

The supported movable part of the roll shell preferably can be a controlled deflection roll, also referred to in the art as a roll with bending compensation. However, it is to be understood that the support element also can be used for other purposes, for instance for the external supporting of rolls or for supporting bands or belts for instance.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
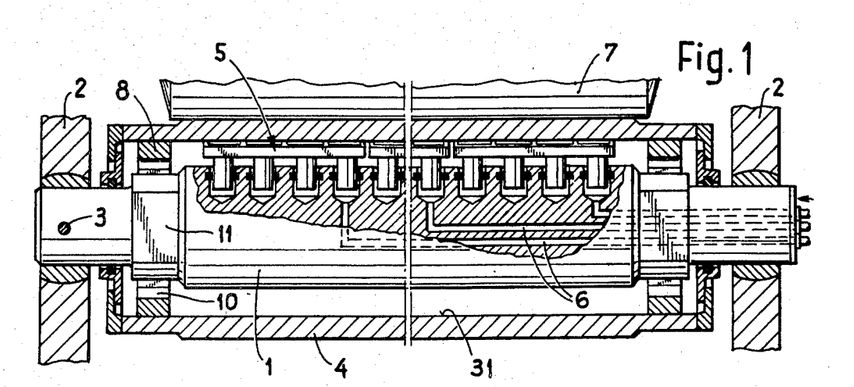
FIG. 1 is a longitudinal sectional view through a controlled deflection roll equipped with support elements according to the invention.

Describing now the drawings, in FIG. 1 there is shown in sectional view a so-called controlled deflection roll constituting the most important field of application of the inventive hydrostatic support element. The principle of the illustrated controlled deflection roll is well known from the aforementioned U.S. Pat. No. 3,802,044, granted Apr. 9, 1974, to which reference is specifically made in this connection.

The controlled deflection roll shown in FIG. 1 will be seen to comprise a stationary support or carrier 1 which is pivotably mounted upon the support elements 2, however, positively supported against rotation by the pin 3 or equivalent structure. Rotatable about the fixed support or carrier 1 is a substantially tubular-shaped roll shell 4 which is supported upon hydrostatic support elements 5. These hydrostatic support elements 5, which will be discussed more fully hereinafter, have infed thereto, through bores 6 of the support 1, hydrostatic pressurized medium at the same or different pressures and which is delivered by any suitable and therefore not further illustrated source.

During operation the support elements 5 exert a pressure force against the inner surface of the roll shell 4, whereby the latter is pressed against an only partially shown counter roll 7. Between the roll shell 4 and the counter roll 7 there is passed the material which is to be rolled, for instance a paper or textile web which has not been particularly shown to simplify the illustration of the drawings.

The ends of the roll shell 4 are provided with guide disks 8 upon which such roll shell 4 is rotatably mounted. The guide disks 8 contain elongate openings 10 which parallel flat or planar guide surfaces which are guided along likewise parallel flat guide surfaces 11 of the support or carrier 1. Such construction is known from the commonly assigned, U.S. Pat. No. 3,885,283, granted May 27, 1975, to which reference may be readily had for further details and the disclosure of which is incorporated herein by reference.

Figure 2:
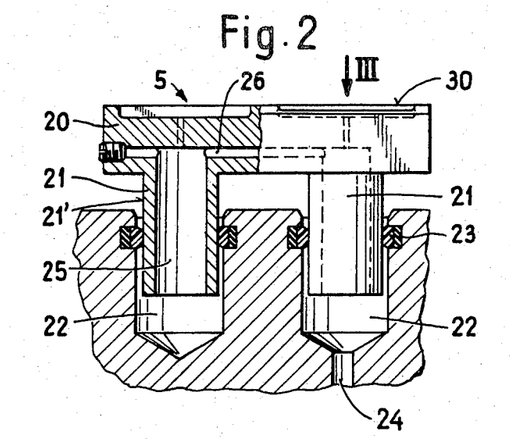
FIG. 2 is a fragmentary sectional view, corresponding to the arrangement of FIG. 1, showing details of a support element having two piston-like projections.
Figure 3:
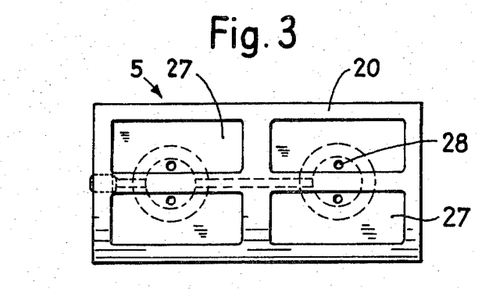
FIG. 3 is a view of the support element shown in FIG. 2 looking in the direction of the arrow III thereof.

FIGS. 2 and 3 show an embodiment of hydrostatic support element 5 simplified in relation to the showing of FIG. 1, this hydrostatic support element 5 having the shape of a support ledge or bar 20 provided with two piston-like projections 21 possessing substantially cylindrical outer surfaces 21'. The projections 21 protrude into cylindrical recesses 22 or equivalent structure of the support 1 and are guided therein by means of the seals 23. One of the recesses 22 is connected, in the manner of the arrangement of FIG. 1, by means of a connection bore 24 with a pressurized medium channel 6 of the support 1.

The cylindrical projections 21, which in this case are formed of one-piece together with the support ledge or bar 20, contain internal bores 25 imparting thereto the shape of tubular-like element or parts. As best seen by referring to FIG. 2, the bores 25 are interconnected with one another by a connection bore 26. By means of this connection bore 26 it is insured that notwithstanding the provision of a single connection bore 24 the same pressure prevails in both cylindrical recesses 22 and by means of which pressure the support ledge or bar 20 is pressed against the inner wall of the roll shell 4.

In a manner known from the aforementioned U.S. Pat. No. 3,802,044, granted Apr. 9, 1974, the support ledge 20 is provided with four hydrostatic bearing pockets 27 which flow communicate by means of the throttle channels 28 with the bores 25 and thus with the cylindrical recesses 22. As a result of this arrangement there is insured that, during operation, there continuously prevails a flow of pressurized fluid medium out of the recesses 22, forming hydrostatic pressure chambers or compartments, to the bearing pockets 27. Due to the throttling action which is present in the channels 28 there prevails a pressure drop which is dependent upon the throughflowing quantity of liquid, and thus, upon the size of the bearing gap between the bearing surface 30 of the support element 5 and the inner surface 31 of the roll shell 4 which is supported by such support element or part 5. Thus, during operation, there is obtained a hydrostatic bearing or support having essentially constant bearing gap between the surfaces 30 and 31, independent of whether or not the roll shell 4 moves in relation to the support 1. The bearing pockets 27 must have a larger hydraulically effective surface than the pistonlike projections 21, since there prevails in these bearing pockets 27 a pressure which has been reduced owing to the throttling action. The mode of operation of the controlled deflection roll and the support elements has been described in detail in the aforementioned, commonly assigned U.S. Pat. Nos. 3,802,044 and 3,885,283.

Continuing, FIGS. 4 to 7 illustrate an embodiment comprising a support ledge equipped with a larger number of hydrostatic support arrangements in the manner of the projections 21. In this case the projections no longer can be fixedly secured to the support ledge or bar 20, as was the case for the embodiment of FIG. 2. In fact, there must be taken into account different thermal expansions between the support ledge and the support as well as length differences which exist during bending-through of the support.

Figure 4:
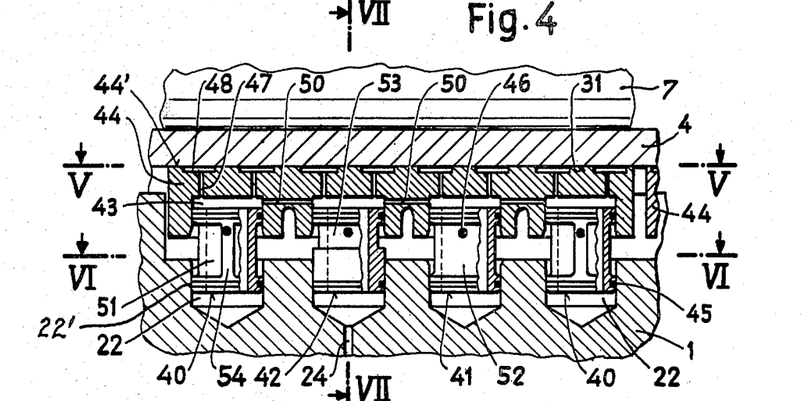
FIG. 4 is a partial sectional view, corresponding to the arrangement of FIG. 1, of a support ledge having four piston-like hydrostatic support arrangements.

As best seen by referring to FIG. 4, constituting a section of the arrangement of FIG. 1, tubular-shaped parts or elements 40, 41 and 42 are guided along cylindrical surfaces 22' of the recesses 22. The opposite ends of the parts 40, 41 and 42 are housed in likewise cylindrical recesses 43 of the support ledge 44. The tubular-shaped parts 40, 41 and 42 are provided at both of their ends with grooves 45 equipped with suitable sealing rings serving to seal these parts in relation to the cylindrical surfaces of the recesses 22 and 43.

Figure 7:
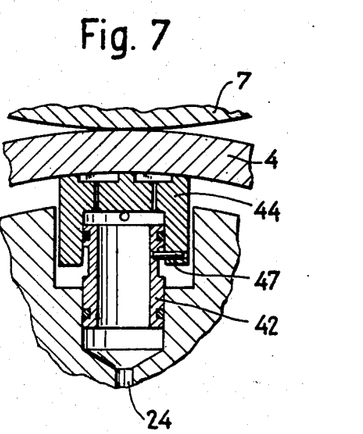
FIG. 7 is an enlarged cross-sectional view of the arrangement of FIG. 4, taken substantially along the line VII—VII thereof.

As apparent from the showing of FIG. 7, the parts 40, 41 and 42 are fixedly retained by pins 47 in the recesses 43 of the support ledge 44, which, however, enable a pivotal movement of the parts 40, 41 and 42 in the recesses 43.

Leading from the recesses 43 are throttle channels 47 to the bearing pockets 48 which are formed in the bearing surface 44' and which function in the described manner. The recesses 43 are interconnected with one another by the connection channels or bores 50, so that only one of the recesses 22 need be connected by means of the connection bore 24 with the pressurized medium line or conduit 6.

Figure 6:
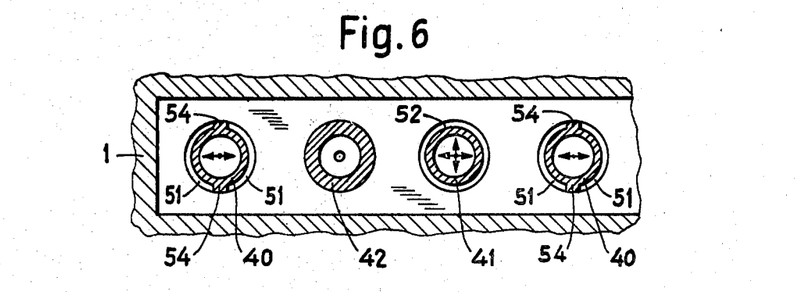
FIG. 6 is a cross-sectional view of the arrangement of FIG. 4, taken substantially along the line VI—VI thereof.

As will be apparent from a comparison of FIGS. 4 and 6, the tubular-shaped parts 40, 41 and 42 are provided with lateral recesses 51 (parts 40, FIG. 6), 52 (parts 41, FIG. 6) and 53 (parts 42, FIG. 4).

The recesses 51 extend at the cylindrical surface between the grooves 45, i.e., between the ends of the tubularshaped parts 40 in each case through somewhat less than onehalf of the periphery of the part 40. Consequently, there are formed in its cylindrical surface ledges 54, by means of which the part 40 is guided with slight play in the related recess 22.

The recess 52 extends at the part 41 at the entire periphery and over almost its entire length between the grooves 45. Therefore there are not formed any ledges.

The recess 53 is formed at the part 42 only at its upper region, which coacts with the support ledge 44. The lower region of the part 42 is guided with slight play in the recess 22.

As apparent from the showing of FIG. 6, the part 42 is guided in axial direction in its recess 22 and is practically not inclinable perpendicular thereto. The parts 40 are guided by the ledges 54 and inclinable to a certain degree perpendicular to the plane in which such ledges 54 are situated. This has been indicated by the shown arrows. The part 41 can be inclined in all directions in the recess 22 owing to the ring-shaped recess 52.

All of the parts 40, 41 and 42 are mounted to be somewhat movable in the support ledge 44, so that this support ledge 44 can incline relative thereto and can be accommodated to the position of the supported inner surface 31 of the roll shell 4. The support ledge 44, as explained in the aforementioned copending U.S. Pat. No. 3,802,044, granted Apr. 9, 1974, is stabilized by the plurality of hydrostatic bearing pockets 48 at the supported surface 31.

By suitable combination of the parts or elements 40, 41 and 42 it is possible to fulfill different requirements. Thus, with the already described arrangement of FIG. 6, the support ledge 44 is fixedly retained, by the part 42, in axial direction of the roll shell 4 and in its peripheral direction. The parts 40, with the aid of the ledges 54, fixedly retain the support ledge 44 in the peripheral direction of the roll shell, however, permit elongation thereof i.e., relative movement in the axial direction.

Figure 8:
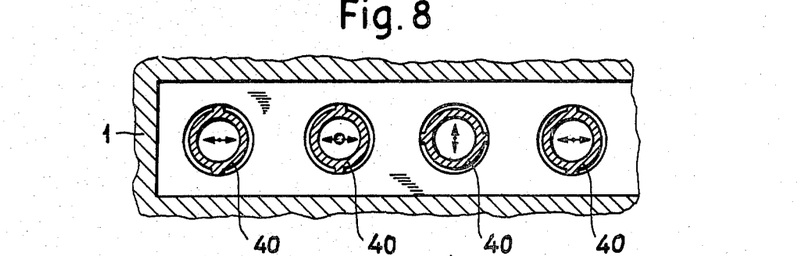
FIG. 8 is an illustration, corresponding to the showing of FIG. 6, of a different arrangement of the piston-like tubular-shaped parts of the support ledge according to FIG. 4.

Now in FIG. 8 there is illustrated a still different possible arrangement, wherein there are only provided tubular-shaped parts or elements 40. The parts 40 illustrated at the ends of FIG. 8 fixedly retain the support ledge in peripheral direction, but allow expansion movements in axial direction. The second tubular-shaped part 40 from the right of the illustration would allow movements of the support ledge 44 in the peripheral direction if such were not fixedly retained at the ends, however fixedly retains the support ledge 44 in axial direction. It should be understood that there are conceivable other different combinations of the parts or elements 40, 41 and 42. In particular, in the case of longer ledges the further parts may be of the type constituted by the parts or elements 41.

Figure 9:
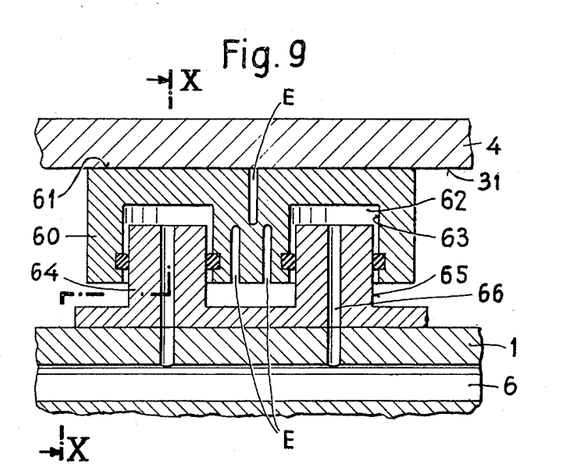
FIG. 9 is an illustration, corresponding to the showing of FIG. 2, of an embodiment wherein the cylinder bores are formed in the support ledge and the support ledge has a hydrodynamic bearing or support surface.
Figure 10:
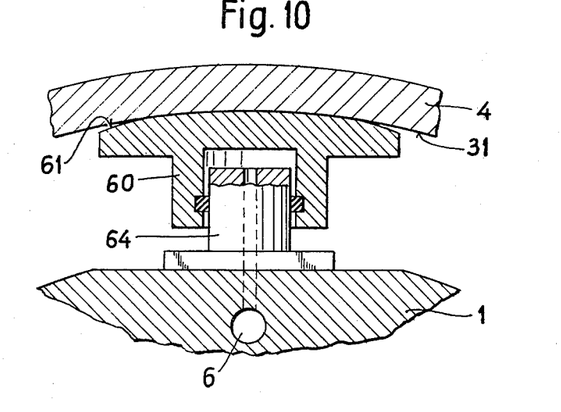
FIG. 10 is a sectional view of FIG. 9, taken substantially along the line X—X thereof.

In FIGS. 9 and 10 there is shown a support ledge 60, which, in this case, does not have any hydrostatic bearing pockets, rather is provided with a suitable bearing surface 61 for hydrodynamic lubrication. Just as was the case for the embodiment of FIG. 6 the inner surface 31 of the roll shell 4 moves upon the bearing surface 61.

A further difference in contrast to the previous exemplary embodiments resides in the fact that the support ledge 60 is not provided with any piston-like projections, rather has substantially cylindrical recesses 62 possessing cylindrical surfaces 63. Piston-like cylindrical projections 64 of the support 1 engage with the cylindrical recesses 62 and have substantially cylindrical outer surfaces 65. The infeed of the hydraulic pressurized medium into the pressure chambers of the recesses 62 is accomplished by means of the bores 66 provided at the projections 64 and which are connected with the channels 6 of the support 1.

Located between the cylindrical surfaces 63 and 65 is a seal, which, either as illustrated, is arranged in a groove of the recess 62 or in a groove at the projection 64.

Figure 11:
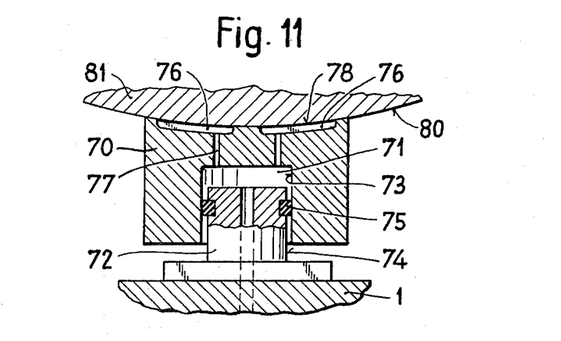
FIG. 11 is an illustration, corresponding to the showing of FIG. 10, of an embodiment wherein the support ledge serves to support a substantially shaft-like part.

The embodiment of FIG. 11 corresponds essentially to that shown in FIGS. 9 and 10 inasmuch as cylindrical recesses 71 are formed at a support ledge 70 and in which engage cylindrical projections 72 of the support or carrier 1. Between the cylindrical surfaces 73 and 74 of the support ledge 70 and the projection 72 there is arranged, as shown, a seal or seal means 75.

Corresponding to the showing of FIG. 11, in this case the support ledge 70 is provided with hydrostatic bearing pockets 76 which, in the already described manner, are connected by throttle channels 77 with the pressure chambers or spaces of the cylindrical recesses 71. In this instance there is mounted upon the bearing surface 78 of the support ledge 70 and equipped with the bearing pockets 76, instead of the inner surface of a roll shell, the outer surface 80 of a cylindrical element or part 81, for instance a shaft or a drum.

Figure 5:
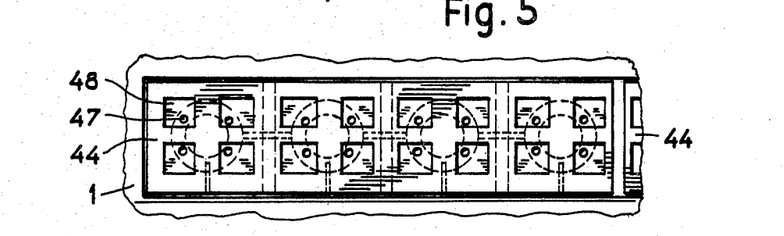
FIG. 5 is a plan view of the support ledge of the arrangement of FIG. 4, viewed substantially in the plane corresponding to line V—V of FIG. 4.
Figure 12:
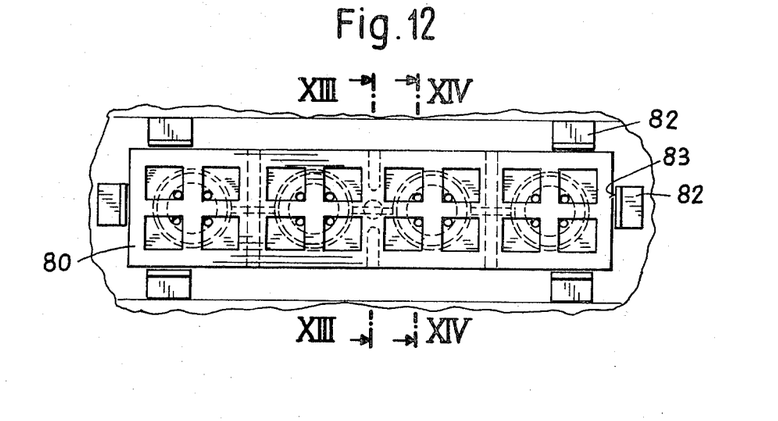
FIG. 12 is a view, corresponding to the showing of FIG. 5, of a further embodiment of the invention.
Figure 13:
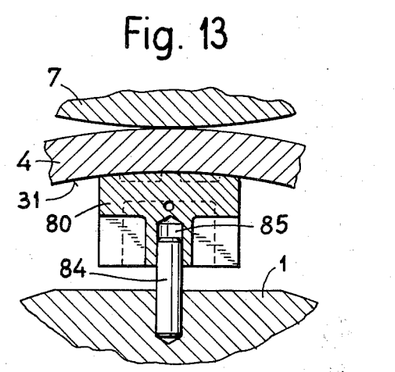
FIG. 13 is a sectional view of the arrangement of FIG. 12, taken substantially along the line XIII—XIII thereof.
Figure 14:
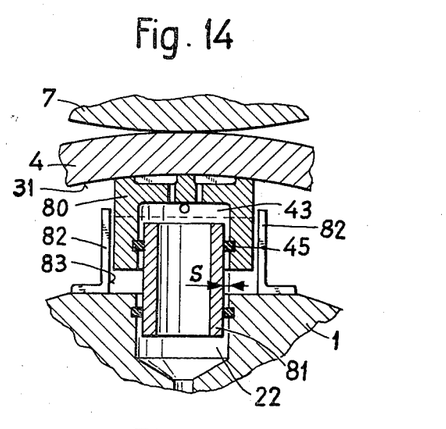
FIG. 14 is a sectional view of the arrangement of FIG. 12, taken substantially along the line XIV—XIV thereof.

FIGS. 12, 13 and 14 show a support element having a support ledge 80 which essentially corresponds to the ledge 44 of the arrangement of FIGS. 4 and 5. As best seen by referring to FIG. 14, in this case there are provided however tubular-shaped parts or elements 81 which have smooth cylindrical surfaces at the inside and outside, and thus, are particularly inexpensive to manufacture. To obtain an inclinability in relation to the recesses 22 in the support 1 and the recesses 43 in the ledge 80, there prevails between the bores of the recesses and the outer surface of the tubular-shaped part 81 a play S which is bridged by the seals 45.

In this case in order to guide the ledge 80 there are employed angle members 82 having guide surfaces 83 and attached to the support or carrier 1. Additionally, as best seen by referring to FIG. 13, there is provided a pin 84 or equivalent structure which is attached at the support 1 and is slidingly guided in a bore 85 in the ledge 80.

It should be understood that also here different combinations of the angle-shaped guide elements 82 with the pin or a number of pins 84 are possible. With an arrangement of the guide elements 82 as shown in FIG. 12 at both lengthwise sides of the ledges 80 as well as at their ends it is possible to dispense with the use of the pin 84. On the other hand, it is conceivable to provide an arrangement wherein there are only used pins 84, of which one is located in a cylindrical bore, the others are guided in elongate slots allowing an axial movement of the ledge.

Figure 15:
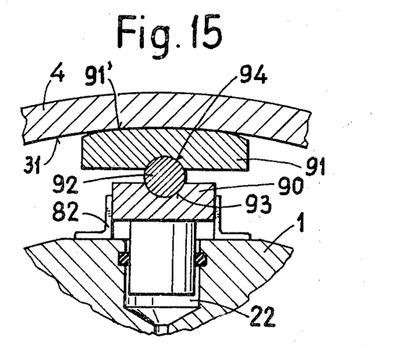
FIG. 15 is a sectional view of an embodiment of the invention having an inclinable ledge with hydrodynamic bearings.
Figure 16:
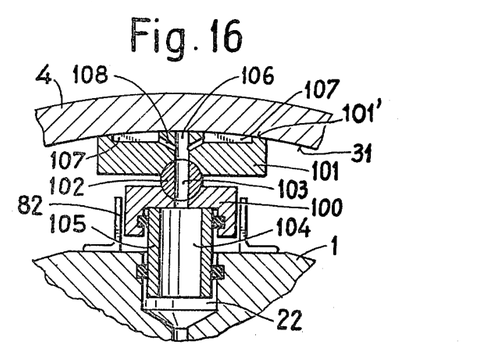
FIG. 16 is a sectional view, corresponding to the showing of FIG. 15, of an inventive device with hydrostatic bearing or support means for the inclinable parts.

Finally, FIGS. 15 and 16 show still further embodiments of the invention, wherein a support ledge 90 and 100, respectively, which can be structured in the described manner, is connected with a bearing shoe 91 and 101, respectively, connected pivotably therewith and which respective bearing shoe has the bearing surface 91' and 101' respectively.

According to the showing of FIG. 15 the bearing shoe 91 is supported upon a cylindrical rod 92 which is embedded in appropriate recesses 93 and 94 in the support ledge 90 and in the bearing shoe 91.

With the embodiment of FIG. 16 there is provided a rod 102 having at least one bore 103 whih communicates with a bore 104 in a piston-like part or element 105 connected with the support ledge 100. The bearing shoe 101 is provided with an opening or bore 106 to both sides of which there are disposed hydrostatic bearing pockets 107. The hydrostatic bearing pockets 107 are connected by means of throttle bores 108 with the opening 106.

As particularly recognized from the illustration of FIGS. 4 and 9, the support ledge can be provided with transversely extending cut-outs E in order to obtain a larger resiliency or yieldability of the support ledge in its lengthwise direction. These cut-outs E are located in each case between the hydrostatic support arrangements.

With such type constructed, particularly elastically yieldable support ledges it is posible to infeed to the individual hydrostatic support arrangements pressurized fluid medium at different pressures, in order to thereby influence, for instance, the pressure course in the press gap or nip of a hydrostatic controlled deflection roll. It should be understood that in such case the connection bores 26 and 50, respectively, in the support ledge are either completely or partially omitted, depending upon whether all support arrangements are individually supplied with the pressurized fluid medium or united into groups.

Figure 17:
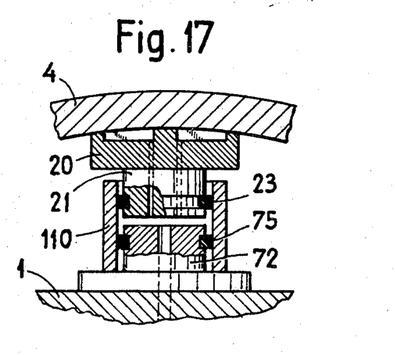
FIG. 17 is a sectional view, corresponding to the showing of FIG. 14, of a further embodiment of the invention.

FIG. 17 illustrates a ledge 20 having cylindrical projections 21, such as for instance shown for the embodiment of FIG. 2. On the other hand, there are attached piston-like parts or elements 72 at the support 1 and which correspond to the parts of FIG. 11 having the same reference character. The projections 21 and 72, with this embodiment, are surrounded by a tube or pipe 110 which forms a common cylinder for both projections 21 and 72. The ledge 20 of the arrangement of FIG. 17 can be guided in relation to the support 1, for instance by means of not particularly illustrated pins of the type shown in FIG. 13 or guide angle members as shown in FIG. 14.

The inventive support element enables an appreciable reduction of the rigidity or stiffness of the roll shell 4, which is possible by virtue of the more uniform supporting thereof in its axial direction. It is even possible to replace the shell by means of a band, for instance a metallic band or a plastic band, which is guided between the counter roll 7 and the support ledge 80 according to FIGS. 13 and 14.

While there are shown and described present preferred embodiments of the invention, it is to be distinctly understood that the invention is not limited thereto, but may be otherwise variously embodied and practiced within the scope of the following claims. Accordingly,

What I claim is:

1. A hydraulic support element for mounting a movable part upon a stationary support, comprising:
   an elongate support ledge having a bearing surface for slidingly supporting the movable part;
   said elongate support ledge together with said support or a part arranged at the support delimiting a hydraulic pressure chamber for a hydraulic medium which is under pressure and by means of which the support element is supported at the support;

said elongate support ledge having an extended dimension sufficient for coacting with at least two hydrostatic support arrangements;
at least two hydrostaic support arrangements having substantially cylindrical guide surfaces for supporting the elongate support ledge at the support; and
said two hydrostatic support arrangements being dispositioned adjacent one another in the lengthwise direction of the elongate support ledge and containing substantially piston-like parts.

2. The hydraulic support element as defined in claim 1, wherein:
said elongate support ledge is provided with recesses in which engage said piston-like parts; and
said piston-like parts being connected with said support.

3. The hydraulic support element as defined in claim 2, wherein:
said piston-like parts are of substantially tubular-shaped configuration.

4. The hydraulic support element as defined in claim 1, wherein:
the support is provided with recesses in which engage said piston-like parts; and
said piston-like parts being connected with said support ledge.

5. The hydraulic support element as defined in claim 4, wherein:
said piston-like parts are of substantially tubular-shaped configuration.

6. The hydraulic support element as defined in claim 1, wherein:
said piston-like parts are of substantially tubular-shaped configuration.

7. The hydraulic support element as defined in claim 1, wherein:
said substantially piston-like parts simultaneously engage into recesses of the elongate support ledge and the support.

8. The hydraulic support element as defined in claim 7, wherein:
said piston-like parts define tubular-shaped parts containing a substantially cylindrical outer surface having lateral recesses which enable inclination thereof relative to the support and the elongate support ledge.

9. A hydraulic support element for mounting a movable part upon a stationary support, comprising:
an elongate support ledge having a bearing surface for slidingly supporting the movable part;
said elongate support ledge together with said support or a part arranged at the support delimiting a hydraulic pressure chamber for a hydraulic medium which is under pressure and by means of which the support element is supported at the support;
at least two hydrostatic support arrangements having substantially cylindrical guide surfaces for supporting the elongate support ledge at the support;
said two hydrostatic support arrangements being dispositioned adjacent one another in the lengthwise direction of the elongate support ledge and containing substantially piston-like parts;
the elongate support ledge and the support are provided with projections;
a substantially tubular-shaped cylinder having opposed ends; and
said projections engaging with both opposed ends of said tubular-shaped cylinder.

10. The hydraulic support element as defined in claim 1, further including:
connection bore means formed in the elongate support ledge for interconnecting at least two pressure chambers of the hydrostatic support arrangements which are associated with a support ledge.

11. A hydraulic support element for mounting a movable part upon a stationary support, comprising:
an elongate support ledge having a bearing surface for slidingly supporting the movable part;
said elongate support ledge together with said support or a part arranged at the support delimiting a hydraulic pressure chamber for a hydraulic medium which is under pressure and by means of which the support element is supported at the support;
at least two hydrostatic support arrangements having substantially cylindrical guide surfaces for supporting the elongate support ledge at the support;
said two hydrostatic support arrangements being dispositioned adjacent one another in the lengthwise direction of the elongate support ledge and containing substantially piston-like parts; and
said elongate support ledge is provided with cut-out means at the region between the hydrostatic support arrangements in order to reduce its stiffness in its lengthwise direction.

12. The hydraulic support element as defined in claim 1, further including:
at least one guide means for guiding the elongate support ledge in the direction of the cylindrical surfaces.

13. The hydraulic support element as defined in claim 12, wherein:
said guide means is secured at the support; and
said guide means having at least one substantially planar guide surface which extends in the direction of movement of the elongate support ledge.

14. The hydraulic support element as defined in claim 12, wherein:
said elongate support ledge and said support define cooperating parts; and
said guide means comprises a substantially cylindrical plug which is secured to one of said cooperating parts and is movably guided in the other said cooperating part.

15. The hydraulic support element as defined in claim 14, wherein:
said one cooperating part is the support and the other cooperating part is the elongate support ledge.

16. The hydraulic support element as defined in claim 14, wherein:
said one cooperating part is the elongate support length and the other cooperating part is the support.

17. The hydraulic support element as defined in claim 1, wherein:
the bearing surface is formed directly at the elongate support ledge.

18. The hydraulic support element as defined in claim 1, wherein:
said elongate support ledge is provided with a bearing shoe pivotably connected therewith; and
said bearing surface being formed at said bearing shoe.

19. The hydraulic support element as defined in claim 1, wherein:
said bearing surface is structured as a hydrodynamic sliding surface.

20. The hydraulic support element as defined in claim 1, wherein:
the bearing surface is provided with a number of hydrostatic bearing pockets; and
separate throttle channel means for connecting the hydrostatic bearing pockets with the pressure chamber of the hydraulic support element.

21. The hydraulic support element as defined in claim 1, wherein:
the supported movable part comprises a roll shell of a controlled deflection roll.

22. The hydraulic support element as defined in claim 1, wherein:
the supported movable part comprises a shaft part.

23. The hydraulic support element as defined in claim 1, wherein:
said supported movable part comprises a drum-like part.

24. The hydraulic support element as defined in claim 1, wherein:
the supported movable part comprises a band.

25. The hydraulic support element as defined in claim 1, wherein:
each hydrostatic support arrangement having an appreciably smaller dimension and different configuration than said elongate support ledge.

* * * * *